(12) United States Patent
Baiker et al.

(10) Patent No.: US 8,173,722 B2
(45) Date of Patent: May 8, 2012

(54) ADHESIVE COMPOSITIONS FOR USE IN SURGICAL THERAPY

(75) Inventors: Anja Baiker, Wurmlingen (DE);
Claudia Haertel, Wurmlingen (DE);
Erich Odermatt, Schaffhausen (CH);
Gabriel Siedle, Freiburg (DE); Thomas Sterk, Rielasingen Worblingen (DE);
Juergen Wegmann, Stockach (DE)

(73) Assignee: Aesculap AG (DE)

( * ) Notice: Subject to any disclaimer, the term of this patent is extended or adjusted under 35 U.S.C. 154(b) by 384 days.

(21) Appl. No.: 12/499,142

(22) Filed: Jul. 8, 2009

(65) Prior Publication Data
US 2010/0010536 A1    Jan. 14, 2010

(30) Foreign Application Priority Data

Jul. 10, 2008    (DE) .................. 10 2008 033 378
Jan. 27, 2009    (DE) .................. 10 2009 007 253

(51) Int. Cl.
*A61K 31/195*    (2006.01)
(52) U.S. Cl. ........... 523/118; 523/105; 606/214; 604/82
(58) Field of Classification Search .................. 523/105, 523/118; 606/214; 604/82
See application file for complete search history.

(56) References Cited

U.S. PATENT DOCUMENTS

| | | | |
|---|---|---|---|
| 3,223,083 A * | 12/1965 | Cobey | 606/92 |
| 3,836,565 A | 9/1974 | Brinkmann et al. | |
| 4,444,933 A | 4/1984 | Columbus et al. | |
| 5,981,621 A * | 11/1999 | Clark et al. | 523/118 |
| 6,204,309 B1 | 3/2001 | Misiak et al. | |
| 6,582,713 B2 * | 6/2003 | Newell et al. | 424/407 |
| 6,642,337 B1 | 11/2003 | Misiak et al. | |
| 6,773,699 B1 | 8/2004 | Soltz et al. | |
| 2003/0202956 A1 | 10/2003 | Clark et al. | |
| 2005/0147457 A1 | 7/2005 | Badejo et al. | |
| 2005/0187561 A1 | 8/2005 | Lee-Sepsick et al. | |
| 2006/0251612 A1 | 11/2006 | Kotzev et al. | |

FOREIGN PATENT DOCUMENTS

| | | |
|---|---|---|
| DE | 2228379 | 12/1973 |
| DE | 3400577 | 7/1985 |
| DE | 19644332 | 4/1998 |
| DE | 197 50 802 | 5/1999 |
| DE | 69619235 | 10/2002 |
| DE | 10212348 | 9/2003 |
| DE | 10 2005 007920 A1 | 8/2006 |
| DE | 69738164 | 6/2008 |
| DE | 102007019044 | 10/2008 |
| EP | 1 369 463 | 9/2007 |
| GB | 2 293 605 | 4/1996 |
| WO | WO 9407420 A1 * | 4/1994 |
| WO | WO 96/10374 A1 | 4/1996 |
| WO | WO 96/10428 A1 | 4/1996 |
| WO | 46630 | 12/1997 |

OTHER PUBLICATIONS

WO 9407420 A1, Apr. 1994, English Abstract.*

* cited by examiner

*Primary Examiner* — Satya Sastri
(74) *Attorney, Agent, or Firm* — DLA Piper LLP (US)

(57) ABSTRACT

An adhesive composition for use in surgical therapy includes at least the following components a) and b): a) a liquid mixture including cyanoactrylate monomers and at least one plasticizer, where the proportion of the at least one plasticizer in component a) is greater than 10% by weight based on the total weight of component a), and b) an aqueous liquid including at least one compound from the group of borate salt, basic amino acid, gelatin and gelatin derivative.

25 Claims, 1 Drawing Sheet

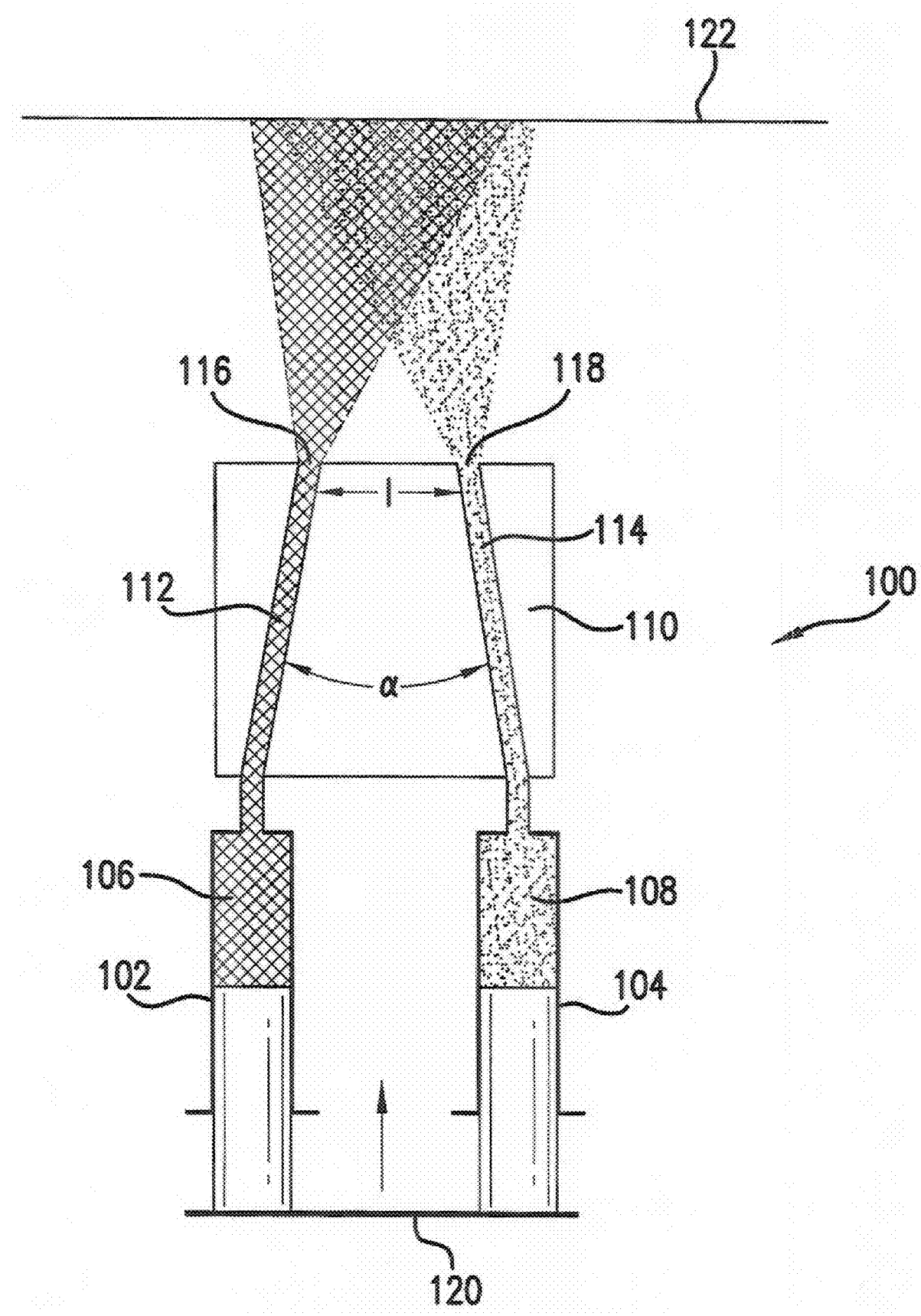

ADHESIVE COMPOSITIONS FOR USE IN SURGICAL THERAPY

RELATED APPLICATIONS

This application claims priority of German Patent Application Nos. 10 2008 033 378.6, filed Jul. 10, 2009, and 10 2009 007 253.5, filed Jan. 27, 2009, herein incorporated by reference.

TECHNICAL FIELD

This disclosure relates to adhesive compositions, kits, application devices and uses of the adhesive compositions.

BACKGROUND

A large number of adhesive compositions are now employed in modern surgical management. The adhesive compositions are frequently based on proteins. One well known example is fibrin glue. Fibrin glues are notable for good biocompatibility and absorbability. Fibrin glues are used, for example, for treating bleeding wounds. However, a disadvantage of fibrin glues is their low adhesive force. In addition, fibrin glues are very costly and moreover show poor storage stability. Thus, fibrin glues must be frozen for storage or preservation. This in turn makes it necessary that the fibrin glues are thawed in good time before use thereof, thus making the handling of these glues involved and complicated. In addition, there is with fibrin glues a certain risk of infection. Moreover, the processing of human material to obtain proteins is costly.

Adhesive compositions based on cyanoacrylate monomers have by contrast a high adhesive force and are relatively low-cost. Since the adhesive compositions are synthetic, there is moreover no risk of infection. However, problems in this connection may be the slow absorption of set adhesive and a low adhesive flexibility, especially in relation to soft and flexible tissues. Since there is in the case of bleeding or weeping wounds the risk that the cyanoacrylate monomers will be washed out of the wound area before the adhesive composition sets, adhesive compositions based on cyanoacrylate monomers are mainly suitable for managing dry wounds.

DE 10 2005 007 920 A1 discloses an adhesive composition based on a liquid cyanoacrylate component and a liquid polysaccharide component. The adhesive composition is particularly suitable for closing and bonding, biological tissues. However, depending on the polysaccharide, for example, with carboxymethylcellulose, the polysaccharide and cyanoacrylate component may become inhomogeneous before the adhesive composition is set. In addition, some polysaccharide derivatives, for example, polysaccharides having amino groups, are soluble only in an acidic medium, and thus the anionic polymerization of the cyanoacrylate component is retarded.

A tissue glue based on methyl cyanoacrylate and gelatin which is particularly suitable for the treatment of bone defects is disclosed in U.S. Pat. No. 3,223,083. However, this glue tends to be hard and in particular brittle, thus limiting its general usability, especially in relation to the management of soft tissue defects.

U.S. Pat. No. 6,773,699 B1 describes a patch based on cyanoacrylate and gelatin for bonding biological tissues. The patch is produced directly on the site on the body to be treated by irradiation with a laser. This entails initially the cyanoacrylate being applied to the site on the body to be treated and subsequently setting to give a layer of polycyanoacrylate. Chemically modified collagen is applied onto this layer and is subsequently irradiated with a laser. A disadvantage of U.S. Pat. No. 6,773,699 B1 is the use of laser technology, which makes the method complicated and in particular costly. There is in addition the risk of damaging healthy tissue.

Further compositions for repairing biological tissues are disclosed in WO 96/10428 A1. The compositions can be polymerized in situ to give an implant. Preferred components mentioned for the compositions are inter alia body proteins and precursors thereof, for example, fibrin and fibrinogen. However, the objections mentioned at the outset apply to these proteins.

It could therefore be helpful to provide an adhesive composition which is suitable in particular for use in surgical therapy and avoids problems known in the art. It could additionally be helpful to produce an adhesive composition as easily as possible and for it to be handled by the user with as few complications as possible.

SUMMARY

We provide an adhesive composition including components a) a liquid mixture including cyanoacrylate monomers and at least one plasticizer, where the proportion of the at least, one plasticizer in component a) is greater than 10% by weight based on the total weight of component a), and b) an aqueous liquid including at least one compound selected from the group consisting of borate salt, basic amino acid, gelatin and gelatin derivative.

We also provide an adhesive union prepared or preparable from the adhesive composition.

We further provide a kit including two containers, wherein one container includes component a) and the other container includes component b) of the adhesive composition.

We still further provide an application device including the adhesive composition.

We also further provide a method of sealing liquid and/or air leaks or closing cavities and/or vessels in a human and/or animal body including applying an adhesive composition including a) liquid mixture including cyanoacrylate monomers and at least one plasticizer, with a plasticizer content in component a) of greater than 10% by weight based on the total weight of component a), and b) an aqueous liquid including at least one compound selected from the group consisting of borate salt, basis amino acid, gelatin and gelatin derivative, to human or animal tissue.

We further yet provide an antimicrobial closure of superficial and/or internal wounds including an adhesive composition including a) liquid mixture including cyanoacrylate monomers and at least one plasticizer, with a plasticizer content in component a) of greater than 10% by weight based on the total weight of componerit a), and b) an aqueous liquid including at least one compound selected from the group consisting of borate salt, basic amino acid, gelatin and gelatin derivative.

BRIEF DESCRIPTION OF THE DRAWING

Further features are evident from the following description of representative examples in a selected from of a description of the Drawing. In this connection, it is possible for individual features to be implemented alone or in combination with one another. The selected examples are merely for explanation and better understanding and are not to be understood as in any way restrictive.

The Drawing shows diagrammatically the construction of an application device for delivering an adhesive composition.

DETAILED DESCRIPTION

It will be appreciated that the following description is intended to refer to specific examples of structure selected for illustration in the drawings and, is not intended to define or limit the disclosure, other than in the appended claims.

We provide adhesive compositions comprising at least the following components a) and b):
- a) a liquid mixture including cyanoacrylate monomers and at least one plasticizer, and
- b) an aqueous liquid including at least one compound from the group of borate salt, basic amino acid, gelatin and gelatin derivative.

It has surprisingly been possible to establish that mixing of components a) and b) results in a dispersion, preferably a suspension, which can be set to give a glue, in particular tissue glue. We found that it is possible to mix components a) and b) to give a settable dispersion without components a) and b) becoming appreciably inhomogeneous. This is because in this regard it has emerged that the at least one plasticizer present in component a) ensures improved mixing of the cyanoacrylate monomers and the at least one compound. A further advantage of the adhesive composition is that the at least one compound present in component b) serves as an initiator or activator of the anionic polymerization of the cyanoacrylate monomers. This particularly advantageously leads to faster setting times. The glue resulting by mixing components a) and b) is distinctly more plastic and in particular more flexible than a pure cyanoactrylate glue so that overall the tissue compatibility is improved. Thus, the glue resulting from the adhesive composition has in particular an improved elasticity in comparison with conventional adhesive compositions. This is particularly advantageous especially in relation to tissues which undergo expansion, for example, lung tissue or pulsating tissues, for example, blood vessels. A hard, brittle glue as described in U.S. Pat. No. 3,223,083 is unsuitable for such applications. On the contrary, such a glue involves the risk of becoming detached from the tissue to be managed or else cutting into the tissue to be managed.

The glue derived from the adhesive composition starting from components a) and b) preferably has a three-dimensional network which is formed by polycyanoacrylate and the at least one compound. A particular advantage is the generally fast absorbability of the glue derived from the adhesive composition by comparison with pure polycyanoacrylate. If the at least one compound is gelatin and/or a gelatin derivative, the glue resulting by setting of the adhesive composition is notable for faster absorbability. This is connected with the fact that the gelatin content of the finished glue is absorbed relatively rapidly by comparison with the polycyanoacrylate. The porous polycyanoacrylate matrix remaining after absorption of the gelatin content is in turn absorbed more rapidly than pure or compact polycyanoacrylate. In addition, cyanoacrylates particularly advantageously also have an antimicrobial effect, it thus being possible, for example, to reduce the risk of wound infections. For this reason, the adhesive composition is suitable inter alia also for antimicrobial sealing of skin wounds.

A glue or adhesive-compound is intended to mean the setting product which is formed by mixing components a) and b) of the adhesive composition.

A polycyanoacrylate is intended to mean a polymer which is or can be obtained by polymerization of cyanoacrylate monomers.

In a preferred aspect, components a) and b) are present spatially separated from one another. Components a) and b) are preferably each in one compartment, in particular container, of a suitable application device. The application device may be, for example, a twin or two-chamber syringe or a spray device, for example, an atomizer. Containers having a water-impermeable layer, a water-impermeable outer membrane or a water-impermeable packaging are particularly advantageous.

The at least one plasticizer is preferably a plasticizer soluble in cyanoacrylate monomers. It is particularly preferred in this connection for component a) to be in the form of a solution, in which case the liquid cyanoacrylate monomers act as solvents or solvent mixtures. Solutions have the advantage over liquid dispersions, in particular suspensions, generally that they can be handled and applied better. For example, solutions can be injected or sprayed better than liquid dispersions. In addition, solutions also have advantages in terms of their storability over liquid dispersions.

In a further aspect, the at least one plasticizer is a plasticizer inert toward cyanoacrylate monomers. An inert plasticizer has the advantage that premature anionic polymerization of the cyanoacrylate monomers and thus premature setting of component a) is prevented. It is thus possible to increase overall the storage stability of the adhesive composition. In a particularly advantageous aspect, the at least one plasticizer of component a) is a plasticizer which is soluble in cyanoacrylate monomers and inert toward cyanoacrylate monomers.

Depending on the proportion of the at least one plasticizer in component a), mixing of components a) and b) and setting of the adhesive composition may result in a soft to hard mass. The adhesive composition can be settable through mixing components a) and b) to give a gel, a paste or a preferably flexible membrane. For example, a hard or firm gel can be prepared from an adhesive composition whose component a) has a plasticizer content of about 25% by weight based on the total weight of component a). Soft gels can be obtained by contrast starting from adhesive compositions whose component a) has a plasticizer content of between about 30 and about 70% by weight based on the total weight of component a).

The proportion of the at least one plasticizer in component a) may in principle be up to about 80% by weight based on the total weight of component a). The proportion of the at least one plasticizer in component a) is preferably greater than about 10% by weight based on the total weight of component a). In a further aspect, the proportion of the at least one plasticizer is greater than about 20% by weight, in particular between about 25 and about 75% by weight, preferably about 25 and about 70% by weight, particularly preferably about 25 and about 50% by weight based on the total weight of component a). As already mentioned, the hardness or softness of the glue which can be produced by the adhesive composition can be adjusted or regulated through the plasticizer content.

In a further aspect, the adhesive composition, has, after the mixing of components a) and b), a pot life or gel time t of $0 < t \leq 300$ s, in particular $1 \leq t \leq 120$ s, preferably $1 \leq t \leq 60$ s. The pot life or gel time is defined as the time after which the viscoelastic properties exceed the flowable properties of a multicomponent mixture. The short pot life or gel time particularly advantageously results in a rapid setting of the adhesive composition after mixing components a) and b). It is thus possible for the adhesive or bonding properties of the adhesive composition to be displayed within a relatively short time in the area of a patient's body region requiring surgical management without the adhesive composition, in particular components a) and b) thereof, being flushed out of the body region to be managed by body fluids. A further possibility is for longer pot lives or gel times to be preferred. Thus, longer pot lives, are desirable especially when the adhesive composition is applied to blood- or fluid-free tissue. A longer pot life makes it possible in these cases for the surgeon to position tissue parts to be united after application of the adhesive composition.

Components a) and b) are preferably present in a mixing ratio of between 1:10 and 10:1, preferably 1:2: and 2:1, by volume. Such mixing ratios by volume particularly allow rapid setting of components a) and b).

It is possible for the cyanoacrylate monomers to be selected from the group of alkyl cyanoacrylate monomers, alkoxyalkyl cyanoacrylate monomers, alkyl ester cyanoacrylate monomers and mixtures thereof. The aforementioned cyanoacrylate monomers include in a further aspect an alkyl group having 1 to 20, in particular 2 to 10, preferably 4 to 8, carbon atoms. The cyanoacrylate monomers are preferably selected from the group of n-butyl cyanoacrylate monomers, i-butyl cyanoacrylate monomers, n-hexyl cyanoacrylate monomers, n-octyl cyanoacrylate monomers, ethoxyethyl cyanoacrylate monomers, methoxypropyl cyanoacrylate monomers, methoxybutyl cyanoacrylate monomers, butyl-lactoyl cyanoacrylate monomers and mixtures thereof. The cyanoacrylate monomers are particularly preferably selected from the group of n-butyl cyanoacrylate monomers, n-octyl cyanoacrylate monomers, ethoxyethyl cyanoacrylate monomers and mixtures thereof. n-Butyl cyanoacrylate monomers are preferred especially because of their high adhesive force. They are commercially available under the name Histoacryl® or Indermil®. Ethoxyethyl cyanoacrylate monomers and/or methoxybutyl cyanoacrylate monomers are preferred mainly because of their rapid absorbability.

The at least one plasticizer may in principle be an organic ester and/or ether. The at least one plasticizer is expediently a biocompatible ester or ether. The at least one plasticizer is preferably selected from the group of citric esters, glycerol esters, sebacic esters, fatty acid esters, cellulose esters, polyethylene glycol ethers and mixtures thereof. Thus, the at least one plasticizer can be selected for example from the group of glycerol triacetate, tributyl acetylcitrate, glycerol tripropionate, glycerol tributyrate, tricaproin, trivalerin, tricaprin, isobutyl myristate, ethyl myristate, ethyl stearate, methyl sebacate, ethyl sebacate, ethylcellulose, polyethylene glycol diethers, preferably polyethylene glycol dimethyl ether, and mixtures.

In a preferred aspect, the proportion of the at least one compound in component b) is between about 0.01 and about 25% by weight, in particular about 0.1 and about 25% by weight, preferably about 0.1 and about 10% by weight, particularly preferably about 0.5 and about 10% by weight, in particular about 0.5 and about 5% by weight, based on the total weight of component b).

In a further preferred aspect, the borate salt is disodium tetraborate decahydrate (borax, $Na_2[B_4O_5(OH)_4] \cdot 8H_2O$ or $Na_2B_4O_7 \cdot 10H_2O$ or $Na_2O \cdot 2B_2O_3 \cdot 10H_2O$).

In a further preferred aspect, the basic amino acid is selected from the group of histidine, lysine, arginine, derivatives thereof and mixtures thereof. Histidine and/or histidine derivatives are particularly preferred.

It is particularly preferred for the at least one compound to be gelatin and/or at least one gelatin derivative. The gelatin or the gelatin derivative may have a molecular weight of between about 10 and about 500 kDa, preferably about 20 and about 100 kDa. The gelatin derivative may be in particular acylated gelatin. Acylated gelatin has the advantage that it is soluble in higher concentrations in aqueous media. It is thus possible to provide a higher gelatin content in component b) of the adhesive composition. A higher gelatin content, in turn brings about faster activation of the cyanoacrylate monomers and thus a faster setting of the adhesive composition, and better biocompatibility. The gelatin derivatives are preferably selected from the group of gelatin polysuccinate, acetylated gelatin and phthaloyl gelatin.

Component b) is preferably in the form of an aqueous solution. Component b) preferably has a pH of between 3.0 and 8.0. The neutral pH of component b) on the one hand brings about a certain biocompatibility when the adhesive composition is applied to a surgical application site. On the other hand, a neutral pH has no disadvantageous effects on the polymerization of the cyanoacrylate monomers.

It is further possible for component b) also to include at least one plasticizer. Plasticizers which are possible and suitable in principle are mannitol, ethylene glycol, liquid polyethylene glycols, propylene 1,2-glycol, liquid polypropylene 1,2-glycols, propylene 1,3-glycol, liquid polypropylene 1,3-glycols, trialkyl citrates, lactic esters, glycolic esters, glycerol, 2-ethyl-2-hydroxymethyl-1,3-propanediol and/or branched polyols. Possibilities in the case of trialkyl citrates are in particular triethyl citrate and/or trimethyl citrate. Methyl lactate and/or ethyl lactate represent suitable lactic esters. Component b) preferably includes glycerol as plasticizer. Component b) may in principle have a plasticizer content of between 0 and about 75% by weight, in particular about 25 and about 50% by weight based on the total weight of component b).

In a further aspect, the viscosity of components a) and/or b) is adjusted so that the viscoelastic properties of the mixture resulting directly by mixing of components a) and b) are large enough for the mixture not to be able to flow away from the surgical application site before the adhesive composition, has set. The viscosity of component a) with a plasticizer content of 30% by weight and at a temperature of 22° C. is preferably between about 1 and about 100 mPas, in particular about 3 and about 20 mPas. The viscosity of component b) with a gelatin and/or gelatin derivative content of 4% by weight and at a temperature of 22° C. is preferably between about 1 and about 100 mPas, in particular about 1 and about 50 mPas. It is particularly preferred for the viscosities of components a) and b) to be similar or substantially identical because good mixing can be achieved in this way.

It is further possible to provide for component a) and/or component b) to comprise additional additives. Suitable examples for component a) are stabilizers such as acids or acid anhydrides. These may be present in component a) in a proportion of between about 50 and about 3000 ppm. Particularly suitable stabilizers are sulfur dioxide, sulfuric acid, acetic acid, phosphoric acid, boric acid derivatives, sulfonic acids and fatty acids. Component a) may further include free-radical scavengers, in particular in a proportion of between about 500 and about 5000 ppm. Examples of suitable free-radical scavengers are, hydroquinone, t-butylhydroxyanisole and/or 3,5-di-tert-butyl-4-hydroxytoluene. Component b) may include or comprise for example procoagulant agents, in particular calcium salts. Component b) may further comprise formaldehyde scavengers which bind formaldehyde resulting from degradation of polycyanoacrylates. Examples of such formaldehyde scavengers are sulfite, bisulfite, ammonium sulfite and/or urea salts.

Component a) and/or b) may further comprise agents which promote wound healing, for example, hyaluronic acid and/or zinc compounds. Suitable zinc compounds are ordinarily zinc salts. These zinc compounds may be for example zinc oxide and/or zinc hyaluronate.

The adhesive composition is, as already mentioned several times, particularly preferably employed in therapy, in particular surgery. In other words, the adhesive composition is preferably a therapeutic, in particular surgical, adhesive composition. The adhesive composition of the invention is particularly preferably suitable for bonding human and/or animal hard and/or soft tissues.

We further provide glues or adhesive unions produced or that can be produced from the adhesive compositions. As likewise already mentioned, such a glue or such an adhesive union results after mixing components a) and b) through polymerization of the cyanoacrylate monomers to a polycyanoacrylate, with the at least one compound serving as activator or initiator of the polymerization of the cyanoacrylate monomers, and the resulting polycyanoacrylate preferably forming together with the at least one compound a three-dimensional network. Concerning further features and details of the glue or of the adhesive composition, reference is made to the previous description in its entirety.

We further provide kits which include at least two, preferably two, containers, where one container includes component a) and the other container includes component b) of the adhesive composition. The containers of the kit are usually present separate from one another. The two containers are preferably configured as chambers of a two-chamber syringe or of a spray device, preferably an atomizer. A possible alternative thereto is for the containers also to be at least two individual syringes or cartridges which are connected together by a holder or a connector. Application can in this case take place, for example, with the aid of a twin delivery apparatus. This makes it possible particularly advantageously for components a) and b) to be put into containers, sterilized and stored or preserved separately. It is further possible for the containers of the kit to be produced differently from one another. It is also possible to provide for the kit to include a unit for mixing components a) and b), in particular a static or dynamic mixer or a spray head. The unit for mixing components a) and b) is preferably replaceable. The unit for mixing components a) and b) can further preferably be fitted onto a two-chamber syringe or spray device. Homogeneous mixing of the components can be achieved in an advantageous manner by the spraying of components a) and b). In addition, the heat evolved, which otherwise possibly leads to tissue damage, when the composition sets can be reduced by spraying the adhesive composition. The spraying can be effected by compressed air, a suitable gas, for example nitrogen or carbon dioxide, a pump spray system or by applying pressure to a syringe plunger or piston. Mixing of components a) and b) can take place before or after the spraying. When components a) and b) are mixed after the spraying, however, the risk of sticking of the spray device is less. Concerning further details and features of the kit, reference is made to the previous description.

We additionally provide application devices which comprise the adhesive compositions. The application device preferably includes at least two compartments, in particular containers, which are substantially separate from one another, where one compartment comprises component a) and the other compartment comprises component b). The application device is in this case preferably configured as two-chamber syringe or spray device, in particular atomizer. The application device may further also include two individual syringes or cartridges. The application device may moreover be configured as metering device which preferably has locking units as equivalents of dose units. Concerning further details and features of the kit, reference is made to the previous description.

Finally, we provide for the use of an a) liquid mixture comprising cyanoacrylate monomers and at least one plasticizer, preferably with a plasticizer content in component a) of greater than 10% by weight based on the total weight of component a), and b) an aqueous liquid comprising at least one compound from the group of borate salt, basic amino acid, gelatin and gelatin derivative, for producing an adhesive composition for use in therapy, in particular surgical therapy, preferably for sealing liquid and/or air leaks and/or for uniting tissue parts in the human and/or animal body. In addition, the adhesive composition is also suitable for sealing or closing cavities and/or vessels in the human and/or animal body. The adhesive composition is particularly preferably used for the treatment or management of soft tissue defects. The adhesive composition is moreover suitable in particular for the antimicrobial closure of superficial and/or internal wounds, for fixing hernia meshes in hernia operations, for stopping hemorrhages, for sealing bowel leaks, for sealing puncture channel hemorrhages, for sealing bladder and/or urethra leaks, for sealing lung leaks, for pericardial plugging, for sealing bowel or vessel anastomoses, for treating injuries to the dura mater and/or for bonding dura mater replacement materials to the dura mater. The adhesive composition can additionally also be employed for further securing of already sutured wounds. A further area of application finally relates to the treatment or management of abrasions.

Concerning further features and details of the adhesive composition, especially of components a) and b) of the adhesive composition, reference is made to the previous description.

The Drawing shows diagrammatically the construction of an application device 100 for application or delivery of an adhesive composition. The application device 100 has two individual syringes 102 and 104, where individual syringe 102 is filled with component a) 106 and individual syringe 104 is filled with component b) 108. The individual syringes 102 and 104 are fitted into a connector 110 in such a way that individual syringe 102 is connected to channel 112 and individual syringe 104 is connected to channel 114 of the connector 110. The channels 112 and 114 open into the nozzles 116 and 118. If the plunger 120 is pushed into the individual syringes 102 and 104, the respective syringe contents 106 and 108 thereof are discharged through channel 112 and nozzle 116, and through channel 114 and nozzle 118, respectively, to a tissue surface 122 to be managed. Components 106 and 108 are finely atomized through emerging from the nozzle. It is possible in this connection for the angle $\alpha$ and the distance l between the channels 112 and 114 to be selected so that the spray cones of components 106 and 108 at least partly overlap at a predetermined spraying distance from the tissue surface 122. The setting of the adhesive composition based on components 106 and 108 is already initiated in the region of overlap of the spray cones, so that on contact with the tissue surface 122 to be managed there is formation, after only a short time, of a firmly adhering and in particular flexible adhesive union, preferably in the form of a film. This is advantageous especially with wounds with heavy bleeding or heavy exudation.

EXAMPLES

1. Production of Hard and Soft Glues

It was possible, by mixing n-butyl cyanoacrylate (NBCA) and an aqueous 4% by weight gelatin solution, to obtain an emulsion which set to a hard mass within 10 seconds. It emerged in this connection that no homogeneous mixing between the NBCA and the gelatin took place.

It was possible to obtain, by mixing a mixture of NBCA and glycerol triacetate (GTA, 1:1 v/v) on the one hand and an aqueous mixture of gelatin and glycerol on the other hand, which was prepared starting from an aqueous 4% by weight gelatin solution and an aqueous 85% by weight glycerol solution (1:1 v/v), firstly an emulsion which set to a firm gel within 60 seconds. When a mixture of NBCA and glycerol triacetate (1:2 v/v) on the one hand and an aqueous mixture of gelatin and glycerol on the other hand, which was prepared starting from an aqueous 4% by weight gelatin solution and an aqueous 85% by weight glycerol solution (1:2 v/v), were mixed it was possible to obtain a soft gel within 30 seconds.

TABLE 1

| | | Mixing ratio | | | | | |
|---|---|---|---|---|---|---|---|
| Component a) | NBCA | 1 | 1 | 1 | 2 | 1 | 1 |
| | GTA | 0 | 0 | 1 | 1 | 2 | 3 |
| Component b) | Gelatin solution 4% | 1 | 1 | 1 | 2 | 1 | 1 |
| | Glycerol solution 85% | 0 | 1 | 1 | 1 | 2 | 3 |
| Result | | hard mass | hard mass | firm gel | firm gel | soft gel | soft gel |

The compositions detailed above were mixed with the aid of a two-chamber syringe with fitted static mixer, thus achieving optically complete mixing of the components.

2. Flexibility Investigations, on Glues Produced from Adhesive Compositions

A liquid mixture was prepared as component a) in the form of a solution of n-butyl cyanoacrylate (commercially available under the name Histoacryl®) and the plasticizer glycerol triacetate in the concentration ranges n-butyl cyanoacrylate/glycerol triacetate 90% by weight/10% by weight to n-butyl cyanoacrylate/glycerol triacetate 10% by weight/90% by weight. In parallel thereto, aqueous gelatin polysuccinate solutions (gelatin polysuccinate is commercially available for example under the name Gelafindin®) were prepared in the concentration ranges 1 to 4% by weight gelatin polysuccinate. In this connection, the glues derived from the following adhesive compositions in particular proved to be very flexible:
  a) n-butyl cyanoacrylate/glycerol triacetate: 70% by weight/30% by weight+2% by weight gelatin polysuccinate
  b) n-butyl cyanoacrylate/glycerol triacetate 60% by weight/40% by weight+2% by weight or 1.5% by weight gelatin polysuccinate
  c) n-butyl cyanoacrylate/glycetol triacetate 50% by weight/50% by weight+2% by weight or 1.5% by weight gelatin polysuccinate
  d) n-butyl cyanoacrylate/glycerol triacetate 40% by weight/60% by weight+2% by weight or 1.5% by weight gelatin polysuccinate
  e) n-butyl cyanoacrylate/glycerol triacetate 30% by weight/70% by weight+2% by weight or 1.5% by weight gelatin polysuccinate.

The flexibility test was in this case carried out in such a way that the mixture resulting from mixing of components a) and b) was applied to a polyethylene film and then subjected to a flexural test. The gels resulting from mixing of components a) and b) detailed above proved to be extremely flexible and could be repeatedly subject to a 180° flexural test without formation of cracks in the film.

3. Spray Test

A liquid mixture in the form of a solution of n-butyl cyanoacrylate (70% by weight) and glycerol triacetate (30% by weight) was mixed with an aqueous 1% by weight gelatin polysuccinate solution and then sprayed onto a defect in a bovine pericardium. The defect covered by the gel was then placed under pressure and examined for failure of the closure. It emerged that the closure in this case withstood a pressure of between 100 and 150 mbar. The closure of the pericardial defect brought about by the gel remained intact even after multiple application of pressure.

4. Elasticity Investigations
  a) Application of a Histoacryl®-GTA (glycerol triacetate) (70/30)-Gelafundin (2%) mixture to a balloon inflated with air took place with the aid of a 2-component spray system. The air was allowed to escape after the application. After waiting for a time of 5 minutes, the balloon was subjected to a filling and emptying cycle of n=10. No change in the applied film was evident after 10 cycles. The film adhered well and showed no cracks at all. The test was carried out again after 30 minutes, and no changes were detectable therein. A repetition after about 20 hours also revealed no change in the applied film.
  b) A balloon was initially filled and emptied again. Then a spray film with a Histoacryl®-GTA (glycerol triacetate) (70/30)-Gelafundin (2%) mixture was applied to the balloon. After 5 minutes (sample was completely polymerized), a filling and emptying cycle (n=10) was carried out here too. As in balloon test 1, no changes at all in the film were detectable. The film also showed no changes in appearance and functionality in a repetition after about 20 hours.
  c) A needle was used to make a defect in a balloon with the intention of sealing it with the aid of a Histoacryl®-GTA (glycerol triacetate) (70/30)-Gelafundin (2%) mixture. The mixture was applied directly to the defect with the balloon filled with air. The balloon was then emptied and the sealing was checked after 5 minutes. It emerged in this case that the defect was sealed. The sealing was tested again after 30 minutes with 10 repetitions and after 20 hours with 10 repetitions. The defect was still sealed.

5. Determination of the Setting Temperature

Various components a) and b) were sprayed in the ratio 1:1 onto a temperature sensor, and the maximum temperature during setting was determined. The results are shown in Table 2.

TABLE 2

| Proportion of NBCA in component a) | Proportion of plasticizer in component a) | Gelatin content in component b) | $T_{max}$ |
|---|---|---|---|
| 50 wt % | 50 wt % GTA | 4 wt % | 33.9° C. |
| 55 wt % | 45 wt % GTA | 2 wt % | 35.6° C. |
| 60 wt % | 40 wt % GTA | 4 wt % | 33.4° C. |
| 70 wt % | 30 wt % GTA | 4 wt % | 43° C. |
| 70 wt % | 30 wt % GTA | 1 wt % | 34.6° C. |

NBCA: n-butyl cyanoacrylate
GTA: glycerol triacetate
TBAC: tributyl acetylcitrate Table 2 makes it clear that the setting temperature of the glue resulting from mixing of component a) and b) can be adjusted purposely by varying the cyanoacrylate, plasticizer and/or gelatin content in component a) or b).

6. Investigation of the Breakdown Characteristics

Various components a) and b) were applied in the ratio 1:1 by means of a double-chamber syringe with fitted static mixer to a polyethylene film. After setting had taken place, 50 mg of each were placed in 7 ml of Sörensen buffer and stored at 70° C. The results are shown in Table 3.

TABLE 3

| Proportion of NBCA in component a) | Proportion of plasticizer in component a) | Gelatin content in component b) | Breakdown in 10 days | Breakdown after 70 days |
|---|---|---|---|---|
| 50 wt % | 50 wt % TBAC | 2 wt % | 76% | 89% |
| 75 wt % | 25 wt % TBAC | 2 wt % | 62% | 81% |

NBCA: n-butyl cyanoacrylate
GTA: glycerol triacetate

7. Investigation of the Flexural Characteristics

Various components a) and b) were applied in the ratio 1:1 by means of a double-chamber syringe with fitted static mixer to a polyethylene film. After a setting time of 10 minutes, a flexural test was carried out with a flexural angle of 180°. The results are detailed in Table 4.

TABLE 4

| Proportion of NBCA in component a) | Proportion of plasticizer in component a) | Gelatin content in component b) | $T_{max}$ |
|---|---|---|---|
| 80 wt % | 20 wt % GTA | 2 wt % | break |
| 70 wt % | 30 wt % GTA | 1.5 wt % | no break |
| 60 wt % | 40 wt % GTA | 1.5 wt % | no break |
| 50 wt % | 50 wt % GTA | 1.5 wt % | no break |
| 40 wt % | 60 wt % GTA | 1.5 wt % | no break |
| 30 wt % | 70 wt % TBAC | 1.5 wt % | no break |

NBCA: n-butyl cyanoacrylate
GTA: glycerol triacetate
TBAC: tributyl acetylcitrate 8. Determination of the Elongation at Break
   a) In a further test, various adhesive compositions were allowed to set in strips 1 cm wide. A tensile testing machine was then used to stretch the strips to breakage. The results are detailed in Table 5.

TABLE 5

| Proportion of NBCA in component a) | Proportion of plasticizer in component a) | Gelatin content in component b) | Elongation at break |
|---|---|---|---|
| 80 wt % | 20 wt % GTA | 4 wt % | 20% |
| 70 wt % | 30 wt % GTA | 4 wt % | 125% |
| 65 wt % | 35 wt % GTA | 2 wt % | 158% |
| 60 wt % | 40 wt % GTA | 2 wt % | 140% |

NBCA: n-butyl cyanoacrylate
GTA: glycerol triacetate

The values indicated in Table 5 show that the elongation at break of the set adhesive composition increases with increasing plasticizer content in component a).

b) 2 ml portions of the components a) and b) shown in Table 6 were put into the chambers of a double-chamber syringe. Components a) and b) were then mixed through a mixing tip with a static mixer and discharged linearly. The discharged mixture was completely set after 30 s.

10×70 mm strips were cut out of the set mixture. The strips were then clamped in a tensile testing machine with hydraulic clamping jaws (distance: 20 mm) and drawn apart at a rate of 50 mm/min. The maximum elongation and the maximum force necessary therefore was detected in this case. Table 6 shows the results obtained in this case.

TABLE 6

| | Component a) | Component b) | Elongation at break | Max. force |
|---|---|---|---|---|
| Mixture 1 | | Gelafundin 2% | 140% | 0.5 N |
| Mixture 2 | Histoacryl ® + glycerol triacetate in the ratio 60/40 | Gelafundin 4% + Sörensen buffer pH = 5.5 in the ratio 1:1 | 640% | 1.5 N |
| Mixture 3 | | Histidine solution 1% pH = 3.0 | 689% | 2.8 N |

9. Determination of the Elasticity of Set Samples

Various adhesive compositions were allowed to set in strips 1 cm wide. The strips were then stretched depending on their fundamental elasticity. The time until the strips returned to their original length was then measured.

TABLE 7

| Mixture | Original length | | 0 s | 20 s | 60 s | 210 s | 410 s |
|---|---|---|---|---|---|---|---|
| NBCA/GTA 70/30 + 2% Gelafundin | 4 cm | Time Elongation | 0 s 125% | 20 s 120% | 60 s 118% | 210 s 115% | 410 s 115% |
| NBCA/GTA 60/40 + 2% Gelafundin | 4 cm | Time Elongation | 0 s 200% | 10 s 150% | 30 s 125% | 50 s 113% | 90 s 105% |
| NBCA/GTA 55/45 + 2% Gelafundin | 2 cm | Time Elongation | 0 s 150% | 15 s 125% | 60 s 115% | 240 s 105% | — — |
| NBCA/GTA 40/60 + 2% Gelafundin | 3 cm | Time Elongation | 0 s 167% | 8 s 133% | 30 s 117% | 140 s 107% | 300 s 103% |

NBCA: n-butyl cyanoacrylate
GTA: glycerol triacetate

The values indicated in Table 7 make it clear that the set adhesive compositions have sufficiently elastic properties to be able to comply with tissue movements like those typically occurring with ling tissue and/or blood vessels.

10. Sealing of Leaks a) Sealing of an Artificial Leak 1.5 ml portions of components a) and b) detailed in Table 8 were put in the chambers of a double-chamber syringe. A hole with a diameter of 27 mm was punched out of a 10×10 cm piece of latex. A plastic ring with a diameter of 38 mm was then placed on top. Components a) and b) were then mixed in a mixing tip with static mixer and applied into the plastic ring. After 30 s, each mixture was set to give a test specimen with a thickness of about 3 mm. The piece of latex with the hole sealed in this way was then clamped onto a pressure chamber with a 60 mm aperture. Excess pressure was applied to the pressure chamber, and the pressure at which the first leak appeared was measured. This resulted in holes which had a diameter of a few millimeters in the film of glue with all the samples. The union with the latex always remained intact.

TABLE 8

| | Component a) | Component b) | Max. pressure (n = 10) |
|---|---|---|---|
| Mixture 1 | | Gelafundin 2% | 13 mbar |
| Mixture 2 | Histoacryl ® + glycerol triacetate in the ratio 60/40 | Gelafundin 4% + Sörensen buffer pH = 5.5 in the ratio 1:1 | 32 mbar |
| Mixture 3 | | Histidine solution 1% pH = 3.0 | 61 mbar | b) Sealing of a Bovine Pericardial Leak

A defect with a diameter of about 10 mm was punched out of a piece of bovine pericardium 10×10 cm in size. A mixture of a solution of NBCA/GTA (n-butyl cyanoacrylate/glycerol triacetate) in the ratio 70% by weight/30% by weight and a 1% by weight aqueous gelatin solution was sprayed onto the defect using a compressed air spray system. The bovine pericardium was then clamped in a device in which pressure could be applied on one side thereof. The maximum pressure until leaks appeared was then determined. A maximum pressure of between 100 and 140 mbar was determined.

On use of a mixture of NBCA/GTA (n-butyl cyanoacrylate/glycerol triacetate) in the ratio 60% by weight/40% by weight and a 2% by weight aqueous gelatin solution, a maximum pressure of 47 mbar was measured. A comparative test with fibrin glue revealed that leaks occurred in the region of the defect with a maximum pressure of only between 5 and 15 mbar.

11. Determination of the Setting Time a) 2 ml portions of the components a) and b) shown in Table 9 below were introduced into the chambers of a double-chamber syringe. Components a) and b) were mixed in a mixing tip with static mixer and then discharged. The time until setting was complete was then determined for the adhesive compositions shown in Table 9 as a function of the storage or preservation time.

TABLE 9

| | Component a) | Component b) | Setting time |
|---|---|---|---|
| Day 1 | Histoacryl ® + glycerol triacetate in the ratio 60:40 | Gelafundin 2% | 5 s |
| | | Gelafundin 4% + Sörensen buffer pH = 5.3, ratio 1:1 | 30 s |
| Day 2 | | Gelafundin 2% | 30 s |
| | | Gelafundin 4% + Sörensen buffer pH = 5.3, ratio 1:1 | 28 s |
| Day 3 | | Gelafundin 2% | 60 s |
| | | Gelafundin 4% + Sörensen buffer pH = 5.3, ratio 1:1 | 31 s |
| Day 4 | | Gelafundin 2% | 20 s |
| | | Gelafundin 4% + Sörensen buffer pH = 5.3, ratio 1:1 | 32 s | b) 2 ml portions of the components a) and b) shown in Table 10 below were introduced into the chambers of a double-chamber syringe. Components a) and b) were mixed in a mixing tip with static mixer and then discharged. The time until setting of the mixtures was complete was then determined.

TABLE 10

| | Component a) | Component b) | Setting time |
|---|---|---|---|
| Mixture 1 | | Borax buffer solution 1% pH = 9 | 2 s |
| Mixture 2 | Histoacryl ® + glycerol triacetate in the ratio 60:40 | Histidine solution 0.01% pH = 5 | 30 s |
| Mixture 3 | | Histidine solution 0.1% pH = 7.5 | 2 s |
| Mixture 4 | | Histidine solution 0.1% pH = 5.6 | 4 s |
| Mixture 5 | | Histidine solution 0.1% pH = 4.8 | 12 s |
| Mixture 6 | | Histidine solution 1% pH = 3.0 | 30 s |

12. Lyophilization of Set Adhesive Compositions and Subsequent Determination of Pore Diameters 1.5 ml portions of components a) and b) detailed in Table 11 were introduced into the chambers of a double-chamber syringe. Components a) and b) were expelled in a mixing tip with static mixer (8 mixing elements) or through a spray nozzle with integrated mixing chamber (SK 01M-1006 from Medmix Systems AG). The set samples were then lyophilized for 16 h and subsequently examined under a scanning electron microscope. The lyophilized samples had pores with a diameter as shown in Table 11.

TABLE 11

| | Component a) | Component b) | Mixer Pore diameter | Spray nozzle Pore diameter |
|---|---|---|---|---|
| Mixture 1 | Histoacryl ® + Glycerol triacetate in the ratio 60:40 | Gelafundin 4% + Sörensen buffer, pH = 5.5 in the ratio 1:1 | <5 μm | <5 μm |
| Mixture 2 | | Histidine solution 1% pH = 3.0 | 200-300 μm | <5 μm |

13. Comparative Tests Between Methyl Cyanoactrylate-Based Adhesive Compositions and n-Butyl Cyanoacrylate-Based Adhesive Compositions 1.5 ml portions of components a) and b) detailed in Table 12 were introduced into the chambers of a double-chamber syringe. Components a) and b) were then discharged linearly with the aid of a spray nozzle with integrated mixing chamber (SK 01M-1006 from Medmix Systems AG). The mixtures were completely set after 30 s. 10×70 mm strips were cut out of the set mixtures. These strips were clamped in a tensile testing machine with hydraulic clamping jaws (distance 20 mm) and drawn apart at a rate of 50 mm/min. The maximum elongation and the maximum force necessary for this was detected. The results are shown in Table 12.

TABLE 12

| | Component a) | | | Max. elongation | Max. tensile force (N) |
|---|---|---|---|---|---|
| | Ingredients | Mixing ratio | Component b) | | |
| Mixture 1 | Methyl cyanoacrylate, glycerol triacetate | 90/10 | Gelafundin 4% + Sorensen | 1.5% | 10.2 |

TABLE 12-continued

|  | Component a) | | Max. | Max. tensile |
| --- | --- | --- | --- | --- |
|  | Ingredients | Mixing ratio | Component b) | elongation | force (N) |
| Mixture 2 | Methyl cyanoacrylate, glycerol triacetate | 80/20 | buffer pH = 5.5 Sorensen buffer in the ratio 50/50 | 1.5% | 7.7 |
| Mixture 3 | Methyl cyanoacrylate, glycerol triacetate | 60/40 | | 2.0% | 1.86 |
| Mixture 4 | n-Butyl cyanoacrylate, glycerol triacetate | 90/10 | | 3.0% | 3.29 |
| Mixture 5 | n-Butyl cyanoacrylate, glycerol triacetate | 80/20 | | 8.5% | 2.46 |
| Mixture 6 | n-Butyl cyanoacrylate, glycerol triacetate | 60/40 | | 495% | 0.58 |

The results depicted in Table 12 show that the n-butyl cyanoacrylate-based adhesive compositions exhibited a distinctly greater elasticity than the methyl cyanoacrylate-based adhesive compositions.

14. Fixing a Hernia Mesh in a Hernia Operation

In an animal experiment on four pigs, a 20 cm incision was performed in the abdominal wall of each, and the transversalis fascia was opened at the linea alba. The transversalis fascia was then readapted. A hernia mesh with a size of 10×30 cm was then placed by the onlay technique on the transversalis fascia and fixed by spot-wise application of an adhesive composition (component a): n-butyl cyanoacrylate/glycerol triacetate in the ratio 70% by weight/30% by weight and component b) aqueous 2% by weight gelatin solution). The distance of the glue spots from the edge of the hernia mesh was about 1 cm. The distance of the glue spots from one another was about 2 cm. It emerged that the use of the adhesive composition made it possible to fix the hernia mesh securely. Thus, no postoperative hernia occurred in an observation period of 10 days. On the contrary, opening of the abdominal wall showed in all the animals complete and planar adhesion, of the mesh with about 30% planar covering with a soft or elastic whitish yellow tissue. In this regard, therefore, the progress of healing was not impaired through the use of the adhesive composition as adhesive for the hernia mesh either.

TABLE 13

Progress of healing after abdominal wall closure with glued meshes

|  | Animal 1 | Animal 2 | Animal 3 | Animal 4 |
| --- | --- | --- | --- | --- |
| Herniation | no | no | no | no |
| Planar adhesion | yes | yes | yes | yes |
| Degree of covering of the mesh with newly formed tissue | 20% | 10% | 50% | 40% |
| Infiltration with inflammatory cells | slight | moderate | moderate | slight |

15. Closure of an Animal Blood Vessel

In a further animal study, closure of a malformed blood vessel with the aid of an adhesive composition was investigated. For this purpose, 2 ml of an adhesive composition (component a): n-butyl cyanoacrylate/glycerol triacetate 70% by weight/30% by weight, component b): aqueous 2% by weight gelatin solution) was injected through a probe with a double tube into a blood vessel with a diameter of about 5 mm in a small pig. The vessel was completely closed within 5 seconds. Explanation after 10 days showed that the blood vessel was safely and permanently closed.

16. Investigation of the Adhesiveness of Adhesive Compositions

The following adhesive compositions were prepared and then applied in each case to an uninjured bovine lung and a bovine lung having a cut surface:

Composition 1: Histoacryl®/glycerol triacetate 60% by weight/40% by weight+1% by weight histidine, pH=3.17

Composition 2: Histoacryl®/glycerol triacetate 60% by weight/40% by weight+2% by weight histidine, pH=3.08

Composition 3: Histoacryl®/glycerol triacetate 60% by weight/40% by weight+2% by weight histidine, pH=4.77

Composition 4: Histoacryl®/glycerol triacetate 60% by weight/40% by weight+2% by weight histidine, pH=5.67

The data in % by weight are based on the total weight of the respective composition. The stated pH values relate to the pH of component b). Table 14 below shows the results obtained on application of adhesive compositions 1 to 4 to an uninjured bovine lung.

TABLE 14

Application of adhesive compositions to an uninjured bovine lung

| | Setting time | Adhesion | Observations |
| --- | --- | --- | --- |
| Mixture 1: | 22 s | very good | Film of glue can be removed from the cut surface only in small pieces; application of a relatively thick film of glue |

TABLE 14-continued

Application of adhesive compositions to an uninjured bovine lung

| | Setting time | Adhesion | Observations |
|---|---|---|---|
| Mixture 2: | 10 s<br>Glue sets to give<br>a thin, flexible film | Good | (application of 1.5 ml to an area of 10 × 6 cm)<br>Film can be detached; small pieces of tissue are also torn out; glue scarcely runs; adheres very well; but can be pulled off<br>Lung membrane is also lifted during the pulling off |
| Mixture 3: | 10 s at thinner places; 30 s at thicker places on the film; glue surface is tacky for up to 80 s after application | very good | Cannot be removed from the Lung |
| Mixture 4: | 5 s | very good | Glue runs slightly; glue cannot be pulled off |

The statements shown in Table 15 below relate to application of adhesive compositions 1 to 4 to a cut surface of a bovine lung.

TABLE 15

Application of adhesive compositions to a cut surface of a bovine lung

| | Setting time | Adhesion | Observations |
|---|---|---|---|
| Mixture 1: | 10 s | very good | Glue can scarcely be removed (tissue residues adhere to the glue) |
| Mixture 3: | 30 s<br>Glue surface still tacky after 60 s, no longer after 90 s | very good | Glue cannot be pulled off (pieces of glue removable with forceps contained tissue residues) |
| Mixture 4: | 12 s | very good | Film cannot be pulled off; tissue residues adhere to the glue |

17. Antibiotic Activity

An adhesive composition component a): n-butyl:cyanoacrylate/glycerol triacetate in the ratio 60% by weight/40% by weight and component b): aqueous 2% by weight gelatin solution) was allowed to set. The set adhesive composition was then extracted with 40 ml of a serum-containing nutrient medium for 24 hours. Subsequently, L-292 mouse fibroblasts were incubated with the extract at 37° C. for 48 hours. All the cells were killed after this.

The invention claimed is:

1. An adhesive composition comprising components a) and b):
   a) a liquid mixture including cyanoacrylate monomers and at least one plasticizer, where the proportion of the at least one plasticizer in component a) is greater than 10% by weight based on the total weight of component a), and
   b) an aqueous liquid including basic amino acid.

2. The adhesive composition as claimed in claim 1, wherein components a) and b) are spatially separated from one another.

3. The adhesive composition as claimed in claim 1, wherein components a) and b) are each present in one compartment of an application device.

4. The adhesive composition as claimed in claim 1, which is set by mixing components a) and b) to give a gel, a paste or a flexible membrane.

5. The adhesive composition as claimed in claim 1, wherein the at least one plasticizer is a plasticizer soluble in cyanoacrylate monomers.

6. The adhesive composition as claimed in claim 1, wherein component a) is in the form of a solution.

7. The adhesive composition as claimed in claim 1, wherein the at least one plasticizer is a plasticizer inert toward cyanoacrylate monomers.

8. The adhesive composition as claimed in claim 1, wherein the proportion of the at least one plasticizer in component a) is greater than about 20% by weight, based on the total weight of component a).

9. The adhesive composition as claimed in claim 1, having, after mixing components a) and b), a pot life or gel time t of $0 \leq t \leq 300$ s.

10. The adhesive composition as claimed in claim 1, wherein components a) and b) are present in a mixing ratio of between 1:10 and 10:1 by volume.

11. The adhesive composition as claimed in claim 1, wherein the cyanoacrylate monomers are selected from the group consisting of alkyl cyanoacrylate monomers, alkoxyalkyl cyanoacrylate monomers, alkyl ester cyanoacrylate monomers and mixtures thereof.

12. The adhesive composition as claimed in claim 1, wherein the cyanoacrylate monomers are selected from the group consisting of n-butyl cyanoacrylate monomers, i-butyl cyanoacrylate monomers, n-hexyl cyanoacrylate monomers, n-octyl cyanoacrylate monomers, ethoxyethyl cyanoacrylate monomers, methoxypropyl cyanoacrylate monomers, methoxybutyl cyanoacrylate monomers, butyllactoyl cyanoacrylate monomers and mixtures thereof.

13. The adhesive composition as claimed in claim 1, wherein the at least one plasticizer is selected from the group consisting of citric esters, glycerol esters, sebacic esters, fatty acid esters, cellulose esters, polyethylene glycol ethers and mixtures thereof.

14. The adhesive composition as claimed in claim 1, wherein the proportion of the at least one compound in component b) is between about 0.01 and about 25% by weight, based on the total weight of component b).

15. The adhesive composition as claimed in claim 1, wherein the basic amino acid is selected from the group consisting of histidine, lysine, arginine, derivatives thereof and mixtures thereof.

16. The adhesive composition as claimed in claim 1, wherein component b) is in the form of an aqueous solution.

17. The adhesive composition as claimed in claim 1, wherein component b) further comprises at least one plasticizer.

18. The adhesive composition as claimed in claim 1, which is a medical adhesive composition that bonds human and/or animal hard and/or soft tissues.

19. An adhesive union prepared or preparable from an adhesive composition as claimed in claim 1.

20. A kit comprising two containers, wherein one container comprises component a) and the other container comprises component b) of the adhesive composition as claimed in claim 1.

21. The kit as claimed in claim 20, wherein the two containers are in each case a chamber of a two-chamber syringe.

22. The kit as claimed in claim 20, comprising a unit for mixing components a) and b), comprising a static or dynamic mixer or a spray head, which can be fitted onto a two-chamber syringe.

23. An application device comprising an adhesive composition as claimed in claim 1.

24. A method of sealing liquid and/or air leaks or closing cavities and/or vessels in a human and/or animal body comprising applying an adhesive composition comprising a) liquid mixture comprising cyanoacrylate monomers and at least one plasticizer, with a plasticizer content in component a) of greater than 10% by weight based on the total weight of component a), and b) an aqueous liquid comprising a basic amino acid.

25. An antimicrobial closure of superficial and/or internal wounds comprising an adhesive composition comprising a) liquid mixture comprising cyanoacrylate monomers and at least one plasticizer, with a plasticizer content in component a) of greater than 10% by weight based on the total weight of component a), and b) an aqueous liquid comprising a basic amino acid.

* * * * *